(12) United States Patent
Harada et al.

(10) Patent No.: US 11,561,079 B2
(45) Date of Patent: Jan. 24, 2023

(54) MAGNETIC SENSOR ASSEMBLY AND CAMERA MODULE HAVING THE SAME

(71) Applicant: TDK Corporation, Tokyo (JP)

(72) Inventors: Kentaro Harada, Tokyo (JP); Tsuyoshi Umehara, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 17/502,724

(22) Filed: Oct. 15, 2021

(65) Prior Publication Data

US 2022/0128345 A1   Apr. 28, 2022

(30) Foreign Application Priority Data

Oct. 23, 2020   (JP) .............................. JP2020-178346

(51) Int. Cl.
*G01B 7/30*   (2006.01)
*G01D 5/14*   (2006.01)
*G01D 5/16*   (2006.01)
*G03B 5/04*   (2021.01)

(52) U.S. Cl.
CPC .............. *G01B 7/30* (2013.01); *G01D 5/145* (2013.01); *G01D 5/16* (2013.01); *G03B 5/04* (2013.01); *G03B 2205/0015* (2013.01); *G03B 2205/0069* (2013.01)

(58) Field of Classification Search
CPC .... G01D 5/12; G01D 5/14–1655; G01B 7/00; G01B 7/30; G03B 5/04
See application file for complete search history.

(56) References Cited

U.S. PATENT DOCUMENTS

| | | | |
|---|---|---|---|
| 2002/0109500 A1* | 8/2002 | Schroeder .............. | G01D 5/145 324/207.2 |
| 2012/0038349 A1* | 2/2012 | Jin ......................... | H02K 29/08 324/207.25 |
| 2012/0143563 A1* | 6/2012 | Ueda .................. | G01D 5/24476 702/151 |
| 2013/0019693 A1* | 1/2013 | Klimenko ............... | B62D 6/10 73/862.331 |
| 2015/0022191 A1* | 1/2015 | Ausserlechner ..... | G01R 33/096 324/207.13 |
| 2018/0231402 A1 | 8/2018 | Okumura et al. | |

(Continued)

FOREIGN PATENT DOCUMENTS

| JP | 2006-094185 A | 4/2006 |
|---|---|---|
| JP | 2018-132356 A | 8/2018 |

*Primary Examiner* — Huy Q Phan
*Assistant Examiner* — David B Frederiksen
(74) *Attorney, Agent, or Firm* — Posz Law Group, PLC

(57) ABSTRACT

Magnetic sensor assembly 1 has first member 10 having first to third magnetic sensors 13A to 13C, and second member 20 having first to third magnets 22A to 22C. Second member 20 can be moved in X and Y directions and can be rotated about a Z axis relative to first member 10. Output of first to third magnetic sensors 13A to 13C monotonously changes. A change of the output of first magnetic sensor and a change of the output of second magnetic sensor are different from each other. First to third magnets are positioned on first to third straight lines L1 to L3. A first angle that is formed between first straight line L1 and X axis, a second angle that is formed between second straight line L2 and X axis, and a third angle that is formed between third straight line L3 and Y axis are same.

19 Claims, 14 Drawing Sheets

(56) References Cited

U.S. PATENT DOCUMENTS

| | | | |
|---|---|---|---|
| 2019/0018082 A1* | 1/2019 | Lee | G01D 5/16 |
| 2019/0277659 A1* | 9/2019 | Duret | G01D 5/24438 |
| 2020/0117283 A1* | 4/2020 | Senft | G06F 3/0346 |

* cited by examiner

MAGNETIC SENSOR ASSEMBLY AND CAMERA MODULE HAVING THE SAME

BACKGROUND OF THE INVENTION

1. Field of the Invention

The present application is based on, and claims priority from, JP 2020-178346, filed on Oct. 23, 2020, the disclosure of which is hereby incorporated by reference herein in its entirety.

The present invention relates to a magnetic sensor assembly and a camera module having the same, particularly to the arrangement of a magnetic sensor assembly.

2. Description of the Related Art

For various applications, a magnetic sensor assembly is used that detects the position of a movable part relative to a fixed part. JP2006-094185 discloses a camera shake compensator that is applied to a camera module. A movable part having an image sensor is provided with Hall elements, and a camera body is provided with a magnet that faces the Hall elements. The displacement of the movable part in two orthogonal directions relative to the camera body, and a rotational angle about an axis perpendicular to the two directions are calculated from the change of the output of the Hall elements.

SUMMARY OF THE INVENTION

The camera shake compensator that is described in JP2006-094185 shows the same change in output of the element, irrespective of the direction in which the Hall elements rotate relative to the magnet. Therefore, another means is required in order to detect the rotational direction of the movable part.

It is an object of the present invention to provide a magnetic sensor assembly that has a simple arrangement and that can detect both the positional relationship of a movable part relative to a fixed part and the rotational direction of the movable part.

A magnetic sensor assembly of the present invention comprises: a first member having first to third magnetic sensors; and a second member having first to third magnets. The second member can be moved in X and Y directions and can be rotated about a Z axis relative to the first member in a three-dimensional Cartesian coordinate system. The first to third magnetic sensors face the first to third magnets in the Z direction, respectively. Output of the first magnetic sensor monotonously changes depending on a relative displacement between the first magnetic sensor and the first magnet in the X direction. Output of the second magnetic sensor monotonously changes depending on a relative displacement between the second magnetic sensor and the second magnet in the X direction. Output of the third magnetic sensor monotonously changes depending on a relative displacement between the third magnetic sensor and the third magnet in the Y direction. When the second member is moved in the X and Y directions and is rotated about the Z axis relative to the first member, a change of the output of the first magnetic sensor and a change of the output of the second magnetic sensor are different from each other. The first to third magnets are positioned on first to third straight lines that extend from an origin of a predetermined X-Y plane, respectively. A first angle that is formed between the first straight line and an X axis, a second angle that is formed between the second straight line and the X axis, and a third angle that is formed between the third straight line and a Y axis are same.

According to the present invention, it is possible to provide a magnetic sensor assembly that has a simple arrangement and that can detect both the positional relationship of a movable part relative to a fixed part and the rotational direction of the movable part.

The above and other objects, features and advantages of the present invention will become apparent from the following description with reference to the accompanying drawings which illustrate examples of the present invention.

DETAILED DESCRIPTION OF THE INVENTION

Figure 1:
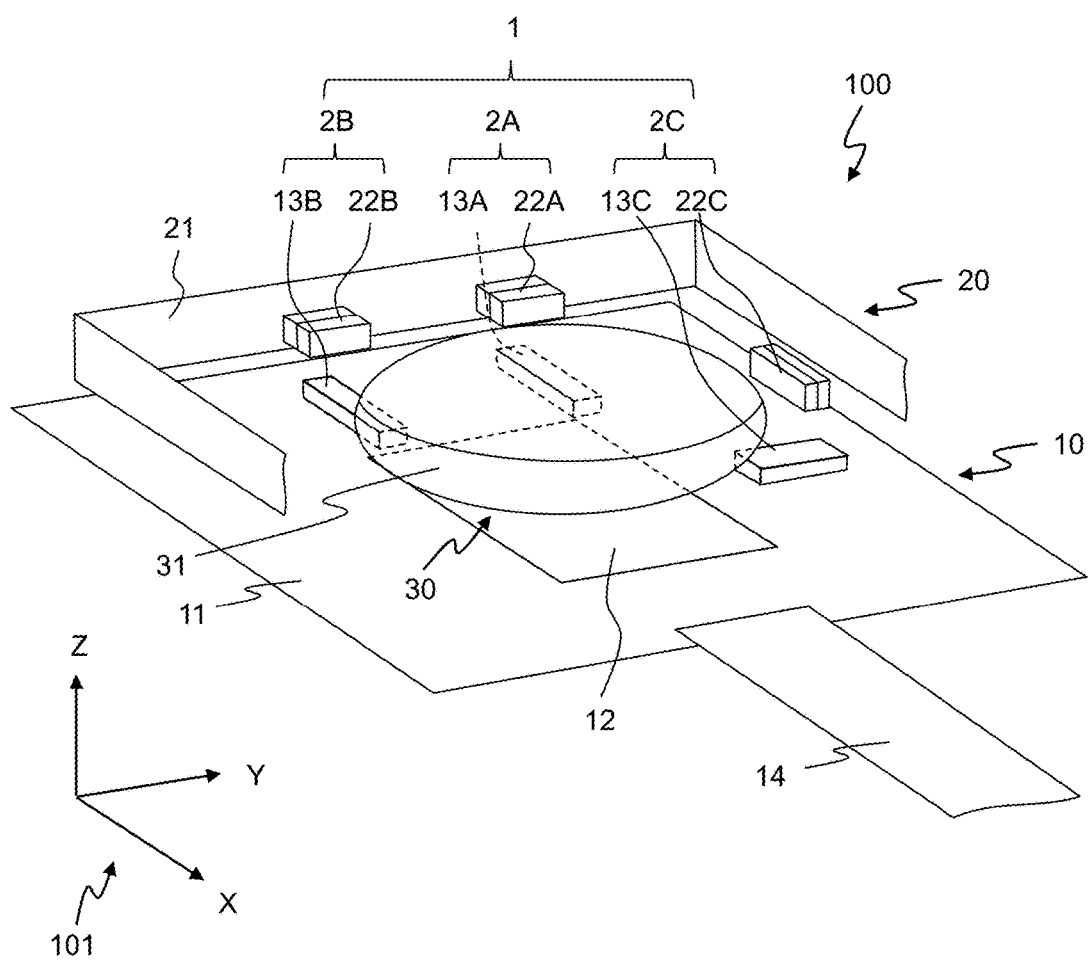
FIG. 1 is a conceptual view of a camera module having a magnetic sensor assembly of the present invention.

Referring to the drawings, a magnetic sensor assembly according to some embodiments of the present invention will now be described. In the following embodiments, the X direction, the Y direction and the Z direction are three directions perpendicular to each other that are defined in three-dimensional Cartesian coordinate system 101. The X direction and the Y direction are perpendicular to the optical axis of a lens, described later, and the Z direction is parallel to the optical axis of the lens. Note that the directions indicated by the heads of the arrows of the X, Y and Z directions in the drawings may be referred to as the +X direction, the +Y direction and +Z direction, and the directions opposite thereto may be referred to as the -X direction, the -Y direction and the -Z direction, respectively.

First Embodiment

FIG. 1 is a conceptual perspective view of camera module 100 having magnetic sensor assembly 1 according to the first embodiment. Camera module 100 is mounted on the main body of a mobile phone, but may be mounted on the camera body of a dedicated camera. Camera module 100 has first member 10 that is fixed to the main body of a mobile phone. First member 10 is fixed relative to three-dimensional Cartesian coordinate system 101. First member 10 includes substrate 11, image sensor 12, first to third magnetic sensors 13A to 13C, a first coil (not shown) and so on. Image sensor 12 is made from a CMOS (Complementary metal-oxide-semiconductor) and the like. Image sensor 12 and first to third magnetic sensors 13A to 13C are mounted on substrate 11. substrate 11 is connected to electric wiring element 14 that connects image sensor 12 to the outside.

Camera module 100 has second member 20 that is movable in three-dimensional Cartesian coordinate system 101. Second member 20 includes rectangular casing 21 and first to third magnets 22A to 22C that are fixed to casing 21. Second member 20 can be moved in the X and Y directions (translation) and can be rotated about the Z axis relative to first member 10 in three-dimensional Cartesian coordinate system 101. Casing 21 houses circular lens 31 therein (inside thereof), as seen in the Z direction, and surrounds lens 31. Lens 31 is supported by casing 21 such that lens 31 is movable in the Z direction relative to casing 21. Lens 31 constitutes a part of a movable part (third member 30) that is movable independently of second member 20. Second coil (not shown) is arranged around lens 31. By supplying electric current to the second coil, Lorentz force is generated between the second coil and first to third magnets 22A to 22C, and lens 31 is driven by the force such that lens 31 is movable in the Z direction relative to casing 21. The autofocus function is thus carried out. Furthermore, by supplying electric current to the first coil, Lorentz force is generated between the first coil and first to third magnets 22A to 22C, and second member 20 is moved in the X and Y directions and is rotated about the Z axis relative to first member 10. The optical image stabilization (OIS) function is thus carried out. In the present embodiment, first to third magnets 22A to 22C are used to drive lens 31, but a magnet that drives lens 31 may be independently provided for the OIS.

Figure 2A:
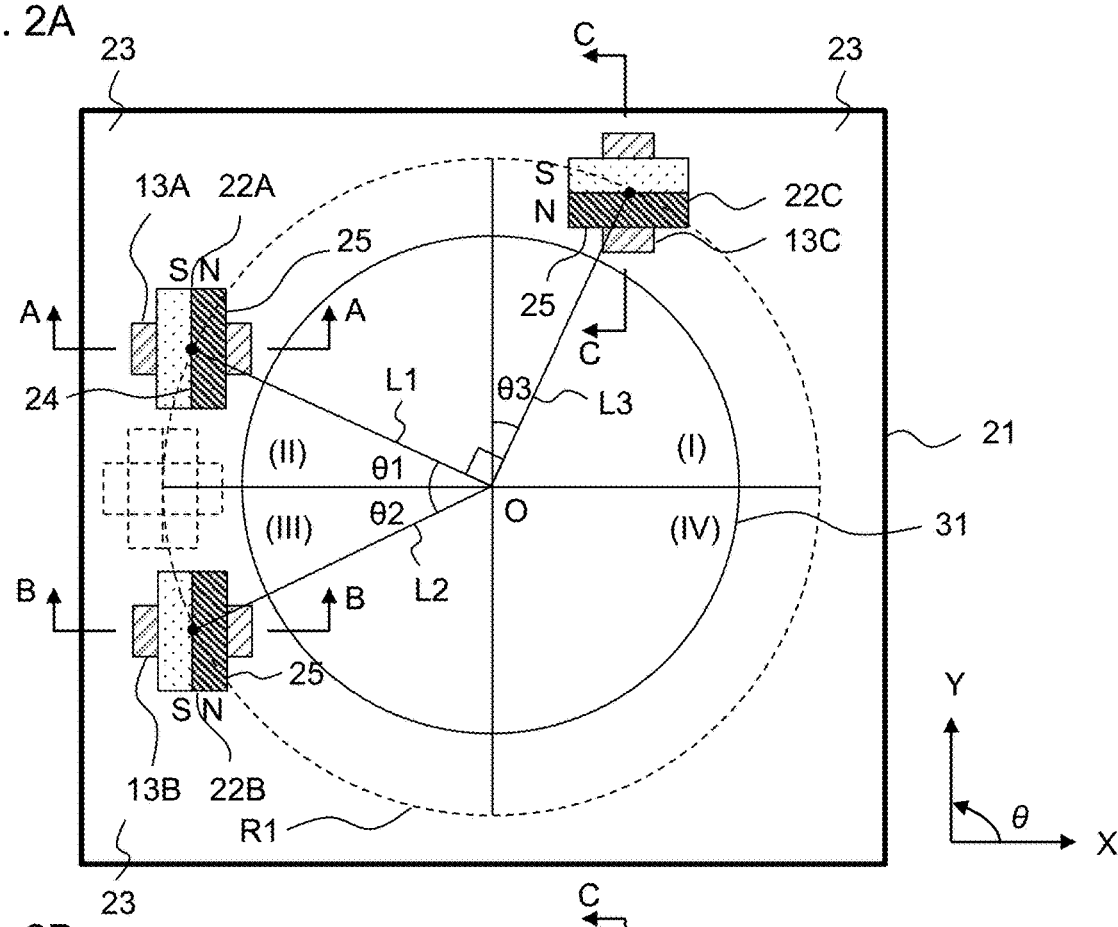
FIGS. 2A, 2B are plan views of the magnetic sensor assembly shown in FIG. 1.
Figure 2B:
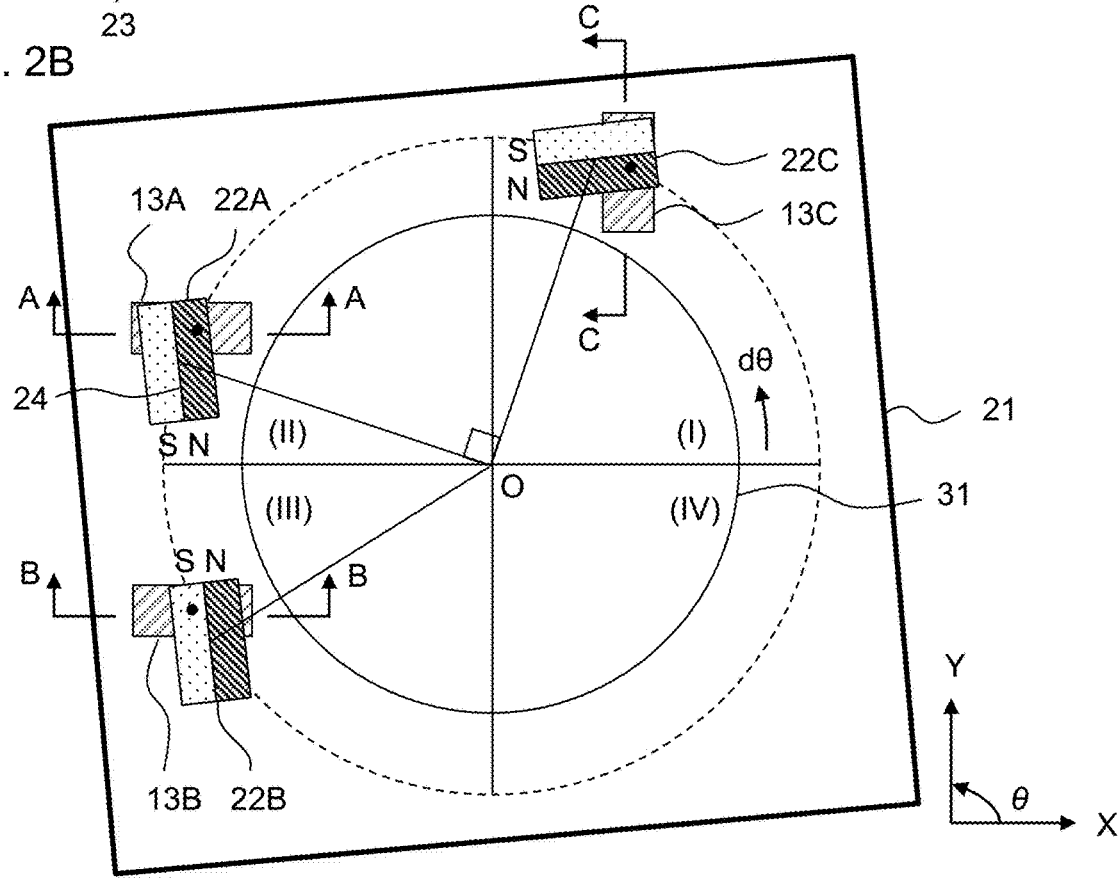
Figure 3A:
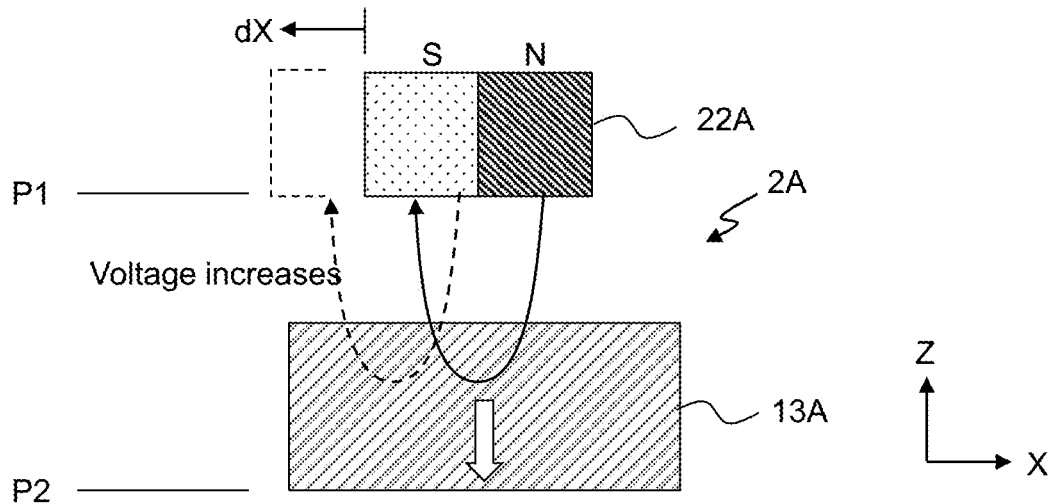
FIGS. 3A to 3C are partial sectional views of the magnetic sensor assembly shown in FIG. 1.
Figure 3B:
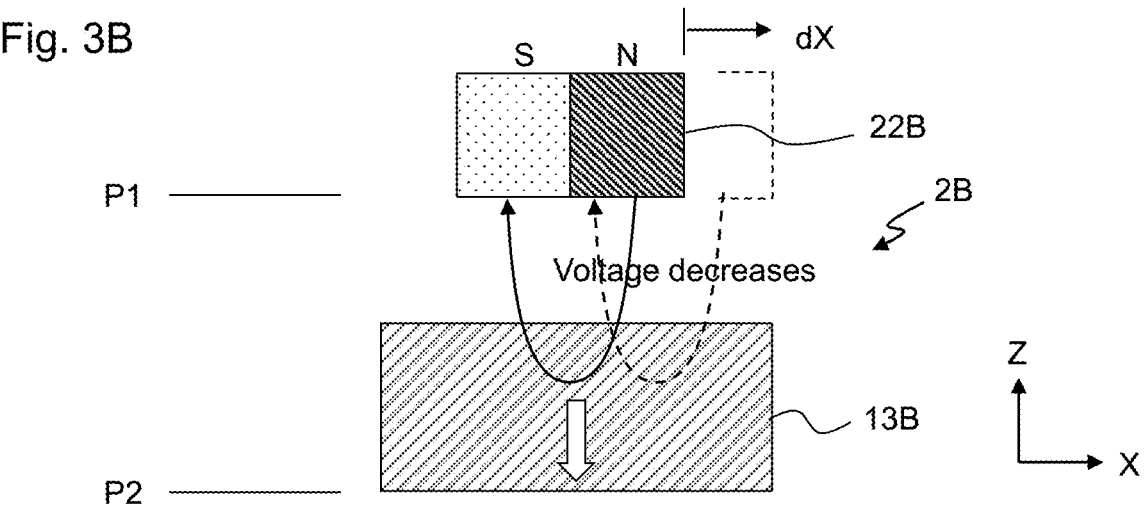
Figure 3C:
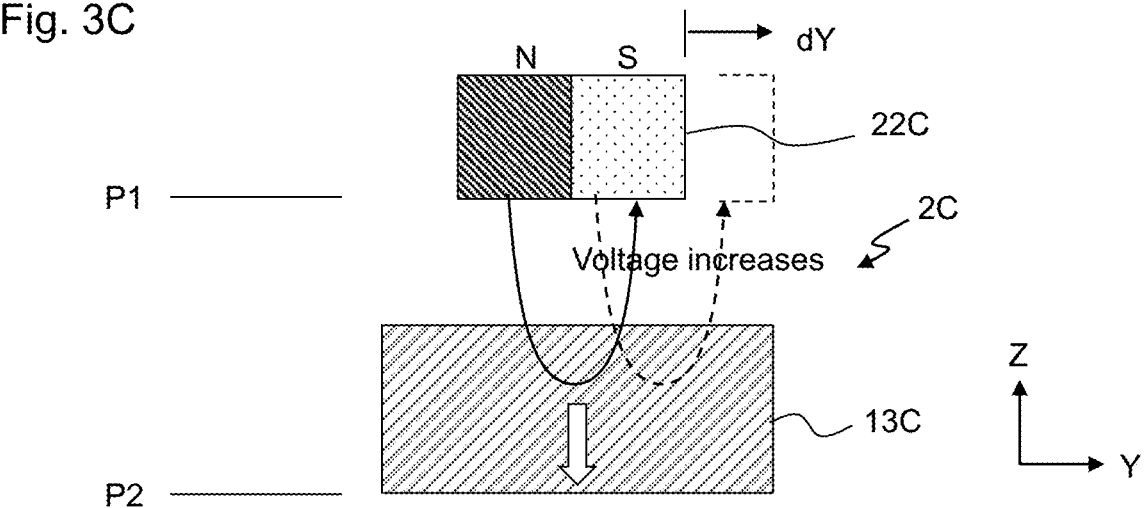

FIGS. 2A, 2B are plan views of magnetic sensor assembly 1, as seen in the Z direction, showing first to third magnets 22A to 22C, first to third magnetic sensors 13A to 13C, lens 31 and casing 21. FIG. 2A shows first to third magnets 22A to 22C at a reference position (a reference state), and FIG. 2B shows second member 20 that is rotated dθ in the counterclockwise direction relative to first member 10. Here, at the reference position, the centers of first to third magnets 22A to 22C correspond to the centers of first to third magnetic sensors 13A to 13C in the Z direction, respectively. FIGS. 3A to 3C are partial sectional views taken along line A-A, line B-B, line C-C in FIGS. 2A, 2B, respectively.

First to third magnets 22A to 22C are positioned on first X-Y plane P1 (a predetermined X-Y plane) of three-dimensional Cartesian coordinate system 101. First to third magnetic sensors 13A to 13C are positioned on second X-Y plane P2 of three-dimensional Cartesian coordinate system 101 that is different from first X-Y plane P1 (on the −Z side in the present embodiment). First to third magnetic sensors 13A to 13C face first to third magnets 22A to 22C in the Z direction, respectively. Specifically, the line that passes through both the center of first magnetic sensor 13A and the center of first magnet 22A in the reference state is parallel to the Z axis, the line that passes through both the center of second magnetic sensor 13B and the center of second magnet 22B in the reference state is parallel to the Z axis, and the line that passes through both the center of third magnetic sensor 13C and the center of third magnet 22C in the reference state is parallel to the Z axis. First magnetic sensor 13A and first magnet 22A constitute first position detector 2A, second magnetic sensor 13B and second magnet 22B constitute second position detector 2B, and third magnetic sensor 13C and third magnet 22C constitute third position detector 2C.

As seen in the Z direction, the set of first magnetic sensor 13A and first magnet 22A (first position detector 2A) and the set of second magnetic sensor 13B and second magnet 22B (second position detector 2B) are positioned in different quadrants of three-dimensional Cartesian coordinate system 101 that are opposite to each other with the X axis interposed therebetween. Furthermore, as seen in the Z direction, the set of third magnetic sensor 13C and third magnet 22C (third position detector 2C) is positioned in a quadrant (first quadrant I) that is different both from the quadrant (second quadrant II), where the set of first magnetic sensor 13A and first magnet 22A (first position detector 2A) is positioned, and the quadrant (third quadrant III), where the set of second magnetic sensor 13B and second magnet (second position detector 2B) is positioned. Furthermore, as seen in the Z direction, the centers of first to third magnets 22A to 22C and the centers of first to third magnetic sensors 13A to 13C are positioned on one circle R1 whose center is positioned at the origin of three-dimensional Cartesian coordinate system 101. In addition, first to third magnets 22A to 22C all have the same arrangement and the same weight. Therefore, the weight balance of second member 20 in the circumferential direction can be easily ensured. Furthermore, first to third magnets 22A to 22C preferably have the same size.

As seen in the Z direction, the centers of first to third magnets 22A to 22C are positioned on first to third straight lines L1 to L3 that extend from origin O of first X-Y plane P1, respectively. First magnet 22A and second magnet 22B are provided in line symmetry in relation to the X axis, and first angle θ1 that is formed between first straight line L1 and the X axis is the same as second angle θ2 that is formed between second straight line L2 and the X axis. Third straight line L3 is perpendicular to first straight line L1. Therefore, third angle θ3 that is formed between third straight line L3 and the Y axis is the same as first and second angles θ1, θ2. Here, first to third angles θ1 to θ3 are defined between 0 and 90 degrees. As will be described later in detail, first and second angles θ1, θ2 may be any angle that is larger than 0 degree and that is less than or equal to 90 degrees (that is, an acute angle or a right angle) and may be appropriately determined depending on the size and the position of the magnets, the shape and the size of casing 21 and the like.

In the present embodiment, first magnet 22A and second magnet 22B are preferably remote from each other to some extent. Specifically, first angle θ1 and second angle θ2 are preferably between 20 and 70 degrees. It is thus possible to arrange first to third magnets 22A to 22C in corner portions 23 of casing 21 or in the vicinity thereof, and to prevent the size of casing 21, as well as the size of camera module 100, from increasing. Furthermore, by ensuring the distance between first magnet 22A and second magnet 22B in the Y direction, it is possible for first magnetic sensor 13A to mainly detect magnetic flux that is generated by first magnet 22A and for second magnetic sensor 13B to mainly detect magnetic flux that is generated by mainly second magnet 22B. As a result, the precision of magnetic sensor assembly 1 is improved.

First to third magnets 22A to 22C are attached to casing 21 such that the N poles thereof face the center of casing 21 or lens 31, i.e., origin O of first X-Y plane P1. However, the lines that are drawn from and perpendicular to end surfaces 25 of the N poles of first and second magnets 22A, 22B are parallel to the X axis, and the lines do not pass through origin O. The line that is drawn from and perpendicular to end surface 25 of the N pole of third magnet 22C is parallel to the Y axis, and the line does not pass through origin O. First magnet 22A and second magnet 22B are magnetized in the same direction, and third magnet 22C is magnetized in a direction perpendicular to the magnetization direction of first and second magnets 22A, 22B. Specifically, in the reference state, the N poles of first magnet 22A and second magnet 22B face the +X direction, and the N pole of third magnet 22C faces the −Y direction.

Each of first to third magnetic sensors 13A to 13C includes a magnetic field detecting element that senses a magnetic field in a predetermined direction. The magnetic field detecting element may be a Hall element, or alternatively, may be a magneto-resistive effect element, such as a GMR element, a TMR element and an AMR element. First to third magnetic sensors 13A to 13C have the same arrangement and the same sensitivity. Magnetic sensor assembly 1 has a processor (not shown) that processes the output from first to third magnetic sensors 13A to 13C. The processor is typically arranged outside of casing 21, but may be arranged inside of casing 21.

The operation of magnetic sensor assembly 1 will now be described. Suppose here that second member 20 is moved dX in the +X direction and dY in the +Y direction (translation) and is relatively rotated dθ in the counterclockwise direction about the Z axis relative to first member 10. The displacement in the +X and +Y directions and the rotation can be treated separately because these are minute. First, suppose that second member 20 is rotated dθ in the counterclockwise direction. As a result, as shown in FIG. 2B and FIGS. 3A to 3C, first magnet 22A is moved in the −X direction, second magnet 22B is moved in the +X direction, and third magnet 22C is moved in the +Y direction.

The magnetic field detecting elements of first to third magnetic sensors 13A to 13C have magnetically sensing axes in the Z direction. Suppose here that the output voltages of first to third magnetic sensors 13A to 13C are proportional to the magnetic flux density that is detected, and the output voltage increases when magnetic flux directed in the −Z direction is detected and decreases when magnetic flux directed in the +Z direction is detected. As shown by the solid line in FIGS. 3A to 3C, at the reference position, the centers of first to third magnetic sensors 13A to 13C correspond to the centers of first to third magnets 22A to 22C, respectively, as seen in the Z direction. Therefore, the magnetic field in the Z direction that is detected by first to third magnetic sensors 13A to 13C is substantially zero. On the other hand, as shown by the broken line in FIG. 3A, when first magnet 22A is moved in the −X direction, magnetic flux that is directed in the −Z direction is detected, and therefore the output voltage of first magnetic sensor 13A increases. Similarly, as shown by the broken line in FIG. 3B, when second magnet 22B is moved in the +X direction, magnetic flux that is directed in the +Z direction is detected, and therefore the output voltage of second magnet 22B decreases. Similarly, as shown by the broken line in FIG. 3C, when third magnet 22C is moved in the +Y direction, magnetic flux that is directed in the −Z direction is detected, and therefore the output voltage of third magnetic sensor 13C increases. When first to third magnets 22A to 22C are moved in opposite directions, the changes in output voltage are reversed. Therefore, the output of first magnetic sensor 13A monotonously changes depending on the relative displacement between first magnetic sensor 13A and first magnet 22A in the X direction, the output of second magnetic sensor 13B monotonously changes depending on the relative displacement between second magnetic sensor 13B and second magnet 22B in the X direction, and the output of third magnetic sensor 13C monotonously changes depending on the relative displacement between third magnetic sensor 13C and third magnet 22C in the Y direction. For convenience, the following understanding is possible: in FIG. 2B, when the center of magnetic sensor faces the N pole, the output voltage increases, and when the center of magnetic sensor faces the S pole, the output voltage decreases.

The same understanding is possible when second member 20 is moved dX in the X direction relative to first member 10 (translation). As will be understood from FIG. 3A, when first magnet 22A is moved in the +X direction, the output voltage of first magnetic sensor 13A decreases, and when first magnet 22A is moved in the −X direction, the output voltage of first magnetic sensor 13A increases. As will be understood from FIG. 3B, when second magnet 22B is moved in the +X direction, the output voltage of second magnetic sensor 13B decreases, and when second magnet 22B is moved in the −X direction, the output voltage of second magnetic sensor 13B increases. Similarly, as will be understood from FIG. 3C, when third magnet 22C is moved in the +Y direction, the output voltage of third magnetic sensor 13C increases, and when third magnet 22C is moved in the −Y direction, the output voltage of third magnetic sensor 13C decreases. Furthermore, as will be understood from the above, first and second magnetic sensors 13A, 13B function as displacement sensors for the X direction, and third magnetic sensor 13C functions as a displacement sensor for the Y direction.

The dimensions of first and second magnets 22A, 22B in the Y direction are larger than the dimensions of first and second magnetic sensors 13A, 13B in the Y direction. Furthermore, in the reference state, first and second magnetic sensors 13A, 13B are positioned at the centers of first and second magnets 22A, 22B in the Y direction, respectively. Therefore, the outputs of first and second magnetic sensors 13A, 13B are not affected by the movement of second member 20 in the Y direction. Similarly, the dimension of third magnet 22C in the X direction is larger than the dimension of third magnetic sensor 13C in the X direction. Furthermore, in the reference state, third magnetic sensor 13C is positioned at the center of third magnet 22C in the X direction. Therefore, the output of third magnetic sensor 13C is not affected by the movement of second member 20 in the X direction.

In the present embodiment, as seen in the Z direction, intermediate planes 24 between the N poles and the S poles of first and second magnets cross circle R1. For example, if first magnet 22A is at the position shown by the broken line in FIG. 2A in a comparative example, then intermediate plane 24 is tangent to circle R1 but does not cross circle R1. In this case, as will be understood from the description above, the N pole faces the center of first magnetic sensor 13A both when first magnet 22A is rotated in the counterclockwise direction and when first magnet 22A is rotated in the clockwise direction, and the output voltage of first magnetic sensor 13A increases. Therefore, the rotation of second member 20 can be detected, but the direction of the rotation cannot be detected. On the other hand, in the present embodiment, in which intermediate plane 24 crosses circle R1, the output voltage of first magnetic sensor 13A increases or decreases depending on the direction in which second member 20 is rotated. Therefore, it is possible to detect the direction in which second member 20 is rotated. The same applies to second and third magnetic sensors 13B, 13C. Furthermore, in the present embodiment, when second member 20 is rotated about the Z axis, first magnet 22A and second magnet 22B are moved in opposite directions in the X direction. Therefore, in the present embodiment, the change of the output of first magnetic sensor 13A and the change of the output of second magnetic sensor 13B are different from each other.

Based on the description above, when second member 20 is moved dX in the X direction (translation) and dY in the Y direction (translation) and is rotated dθ about the Z axis relative to first member 10, the change of the output $V_{x1}$ of first magnetic sensor 13A, the change of the output $V_{x2}$ of second magnetic sensor 13B, and the change of the output Vy of third magnetic sensor 13C are calculated as follows.

$$V_{X1} = f_{(dX)} + f_{(d\theta)} \quad \text{(formula 1)}$$

$$V_{X2} = f_{(dX)} - f_{(d\theta)} \quad \text{(formula 2)}$$

$$V_y = f_{(dY)} + f_{(d\theta)} \quad \text{(formula 3)}$$

Here, $f_{(dX)}$, $f_{(dY)}$, $f_{(d\theta)}$ represent changes in the output of the first to third magnetic sensors 13A, wherein $f_{(dX)}$, $f_{(dY)}$, $f_{(d\theta)}$ are caused by dX, dY and dθ, respectively. (Formula 1) to (formula 3) are transformed as follow.

$$f_{(dx)} = V_{x1} - (V_{x1} - V_{x2})/2 \quad \text{(formula 4)}$$

$$f_{(dy)} = V_y - (V_{x1} - V_{x2})/2 \quad \text{(formula 5)}$$

$$f_{(d\theta)} = (Vx1 - Vx2)/2 \quad \text{(formula 6)}$$

The movement (dX, dY, dθ) of second member 20 relative to first member 10 can be thus calculated from $f_{(dx)}$, $f_{(dy)}$ and $f_{(d\theta)}$. This calculation can be carried out by processor 16.

As described above, in the present embodiment, the relative displacement of second member 20 in the X and Y directions and the relative rotational angle of second member 20 about the Z axis relative to first member 10 can be calculated using three magnets 22A to 22C and three magnetic sensors 13A to 13C. Since first to third angles θ1 to θ3 can be selected from a wide variety of angles, the size of magnetic sensor assembly 1 can be reduced by properly arranging first to third magnetic sensors 13A to 13C and first to third magnets 22A to 22C.

Modifications to the First Embodiment and Comparative Examples

Figure 4:
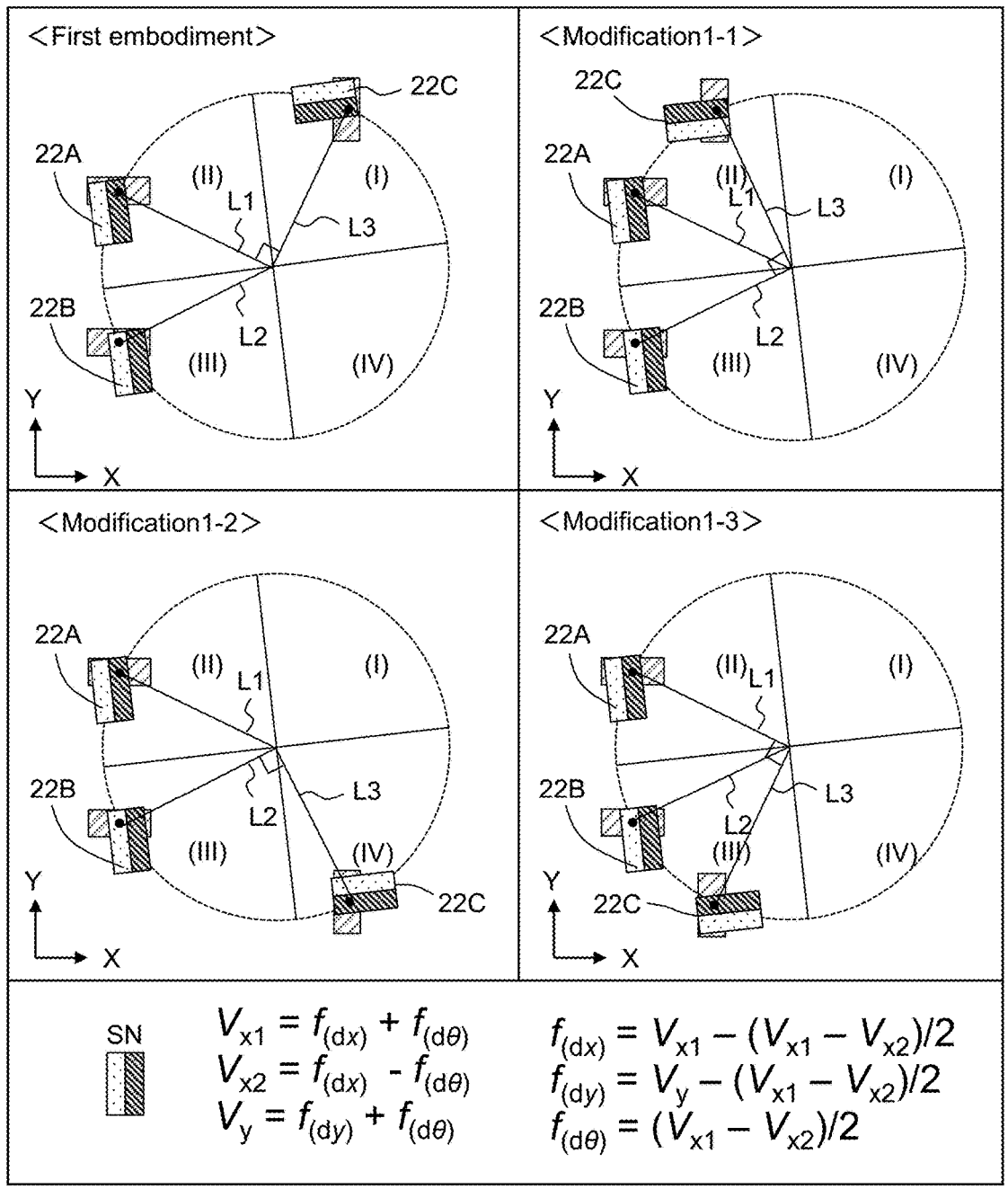
FIG. 4 is a plan view of the magnetic sensor assemblies of a first embodiment and modifications.

The positions where first to third magnetic sensors 13A to 13C and first to third magnets 22A to 22C are arranged are not limited to the first embodiment as long as (formula 1) to (formula 6) are satisfied. FIG. 4 shows the first embodiment and some modifications. Second member 20 is shown to be rotated dθ in the counterclockwise direction. In modification 1-1, third magnet 22C is arranged in second quadrant II, where first magnet 22A is arranged, and third straight line L3 is perpendicular to second straight line L2. In other words, third magnet 22C is in line symmetry with third magnet 22C of the first embodiment in relation to the Y axis. In modification 1-2, third magnet 22C is arranged in fourth quadrant IV, and third straight line L3 is perpendicular to second straight line L2. In other words, third magnet 22C is in line symmetry with third magnet 22C of the first embodiment in relation to the X axis. In modification 1-3, third magnet 22C is arranged in third quadrant III, and third straight line L3 is perpendicular to first straight line L1. In other words, third magnet 22C is point symmetrical to third magnet 22C of the first embodiment in relation to origin O. In these cases, when second member 20 is rotated dθ in the counterclockwise direction, the N pole of third magnet 22C faces the center of third magnetic sensor 13C, and (formula 1) to (formula 6) are satisfied.

Figure 5:
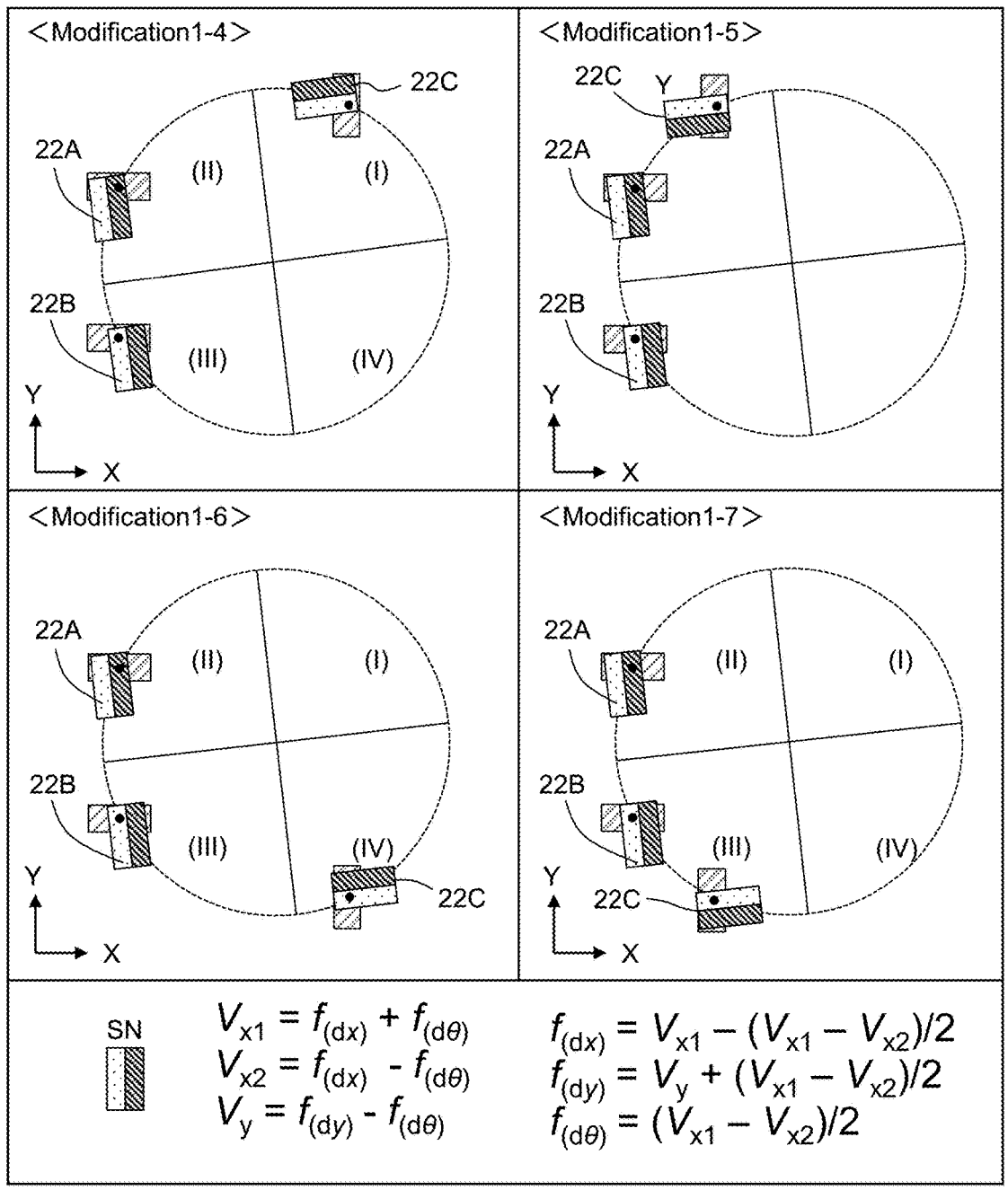
FIG. 5 is a plan view of the magnetic sensor assemblies of other modifications to the first embodiment.

FIG. 5 shows other modifications to the first embodiment. Second member 20 is shown to be rotated dθ in the counterclockwise direction. First to third magnets 22A to 22C of modifications 1-4 to 1-7 are arranged at the same positions as those of the first embodiment and modifications 1-1 to 1-3, respectively, but, third magnet 22C is magnetized in the opposite direction. In these cases, the following formulas are satisfied.

$$V_{X1} = f_{(dX)} + f_{(d\theta)} \quad \text{(formula 1)}$$

$$V_{X2} = f_{(dX)} - f_{(d\theta)} \quad \text{(formula 2)}$$

$$V_y = f_{(dY)} - f_{(d\theta)} \quad \text{(formula 3')}$$

$$f_{(dx)} = V_{x1} - (V_{x1} - V_{x2})/2 \quad \text{(formula 4)}$$

$$f_{(dy)} = V_y - (V_{x1} - V_{x2})/2 \quad \text{(formula 5')}$$

$$f_{(d\theta)} = (V_{x1} - V_{x2})/2 \quad \text{(formula 6)}$$

That is, $f_{(dX)}$, $f_{(dy)}$, $f_{(d\theta)}$ can be basically calculated in the same manner as the first embodiment, with only (formula 3) and (formula 5) being different. Although not illustrated, the same result can be obtained using the third magnetic sensor having inverse polarity (that is, when magnetic flux that is directed in the −Z direction is detected, the output voltage decreases, and when magnetic flux that is directed in the +Z direction is detected, the output voltage increases).

Figure 6:
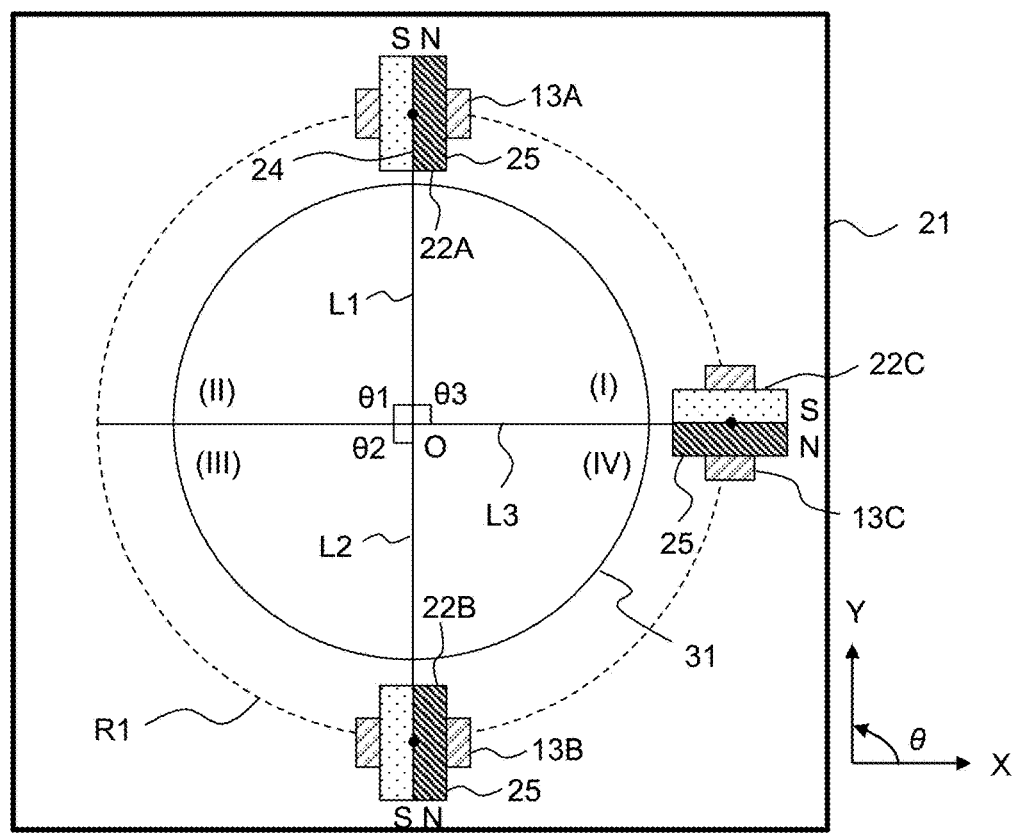
FIG. 6 is a plan view of the magnetic sensor assembly of another modification to the first embodiment.

FIG. 6 shows another modification to the first embodiment. FIG. 6 is a plan view, similar to FIG. 2A, of magnetic sensor assembly 1 of the present modification, as seen in the Z direction. In the present modification, all of first to third angles θ1 to θ3 are 90 degrees. The lines drawn from and perpendicular to end surfaces 25 of the N poles of first magnet 22A and second magnet 22B are parallel to the X axis, and the lines do not pass through origin O. The line drawn from and perpendicular to end surface 25 of the N pole of third magnet 22C is parallel to the Y axis, and the line does not pass through origin O. First magnet 22A and second magnet 22B are magnetized in the same direction, and third magnet 22C is magnetized in a direction perpendicular to the magnetization direction of first and second magnets 22A, 22B. That is, the present modification is the same as the first embodiment except that all of first to third angles θ1 to θ3 are 90 degrees. Therefore, the present modification satisfies formulas (1) to (6), and operates in the same manner as the first embodiment.

Figure 7:
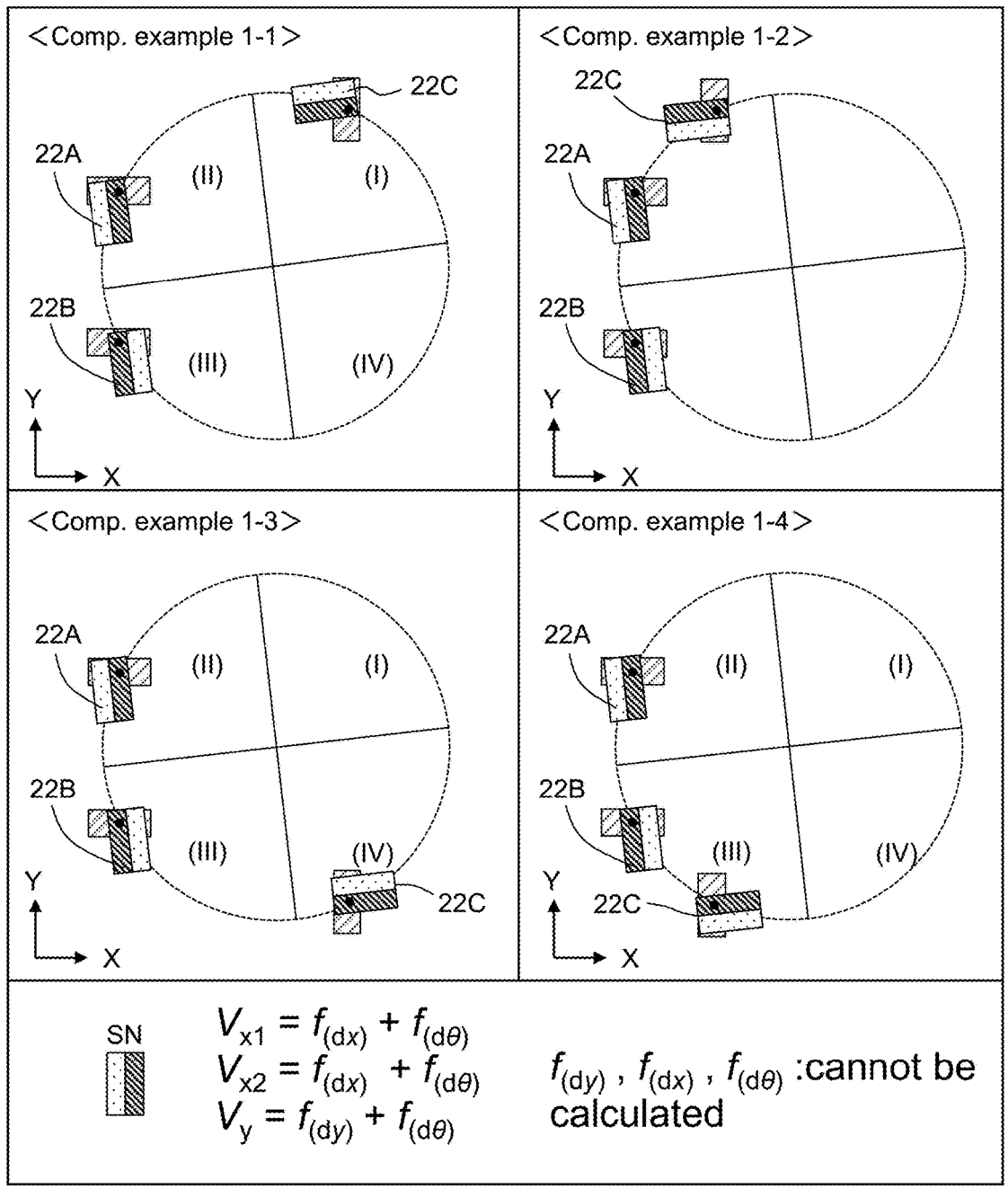
FIG. 7 is a plan view of the magnetic sensor assemblies of comparative examples.

FIG. 7 shows comparative examples. Second member 20 is shown to be rotated dθ in the counterclockwise direction. Comparative examples 1-1 to 1-4 correspond to the first embodiment and modification 1-1 to 1-3, respectively, but second magnet 22B is magnetized in the opposite direction. Therefore, when second member 20 is rotated dθ in the counterclockwise direction, the N pole of second magnet 22B faces the center of second magnetic sensor 13B. Because the N pole of first magnet 22A also faces the center of first magnetic sensor 13A, the output of first magnetic sensor 13A becomes the same as the output of second magnetic sensor 13B ($V_{x1} = V_{x2}$). In this case, $f_{(dX)}$ cannot be calculated, and therefore, $f_{(dy)}$ and $f_{(d\theta)}$ cannot be calculated, either. It is understood from the comparative examples that the output of first magnetic sensor 13A and the output of second magnetic sensor 13B need to be different from each other in order satisfy (formula 1) to (formula 6).

Second Embodiment

Figure 8A:
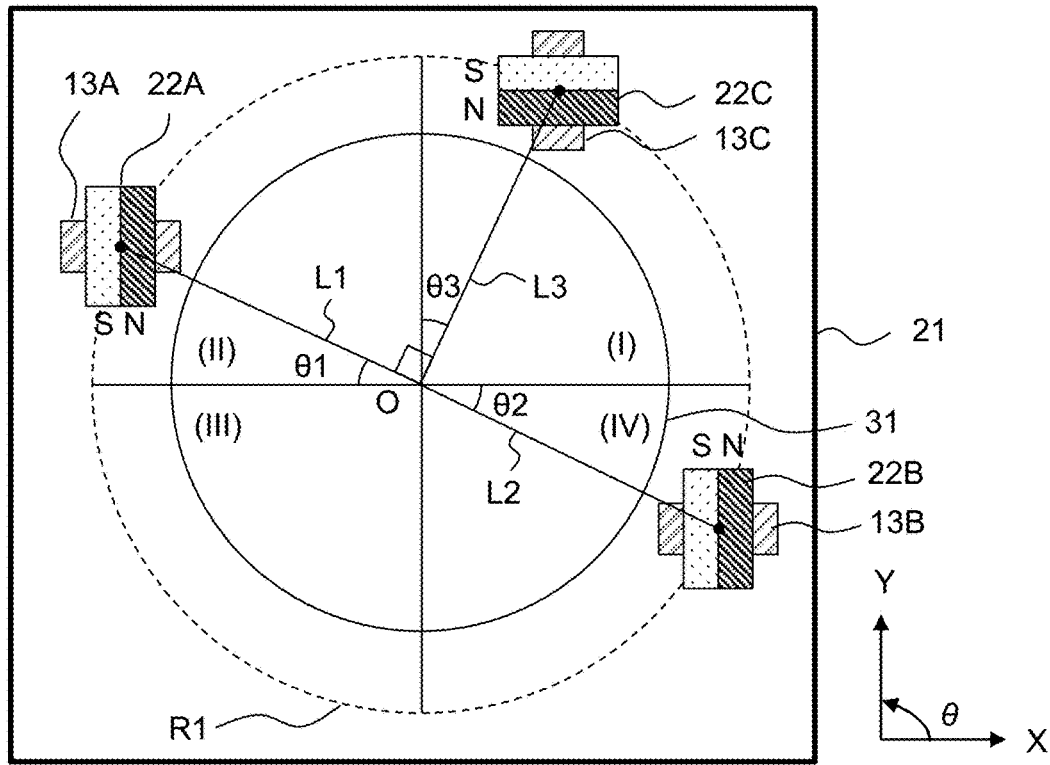
FIGS. 8A, 8B are plan views of the magnetic sensor assembly of a second embodiment.
Figure 8B:
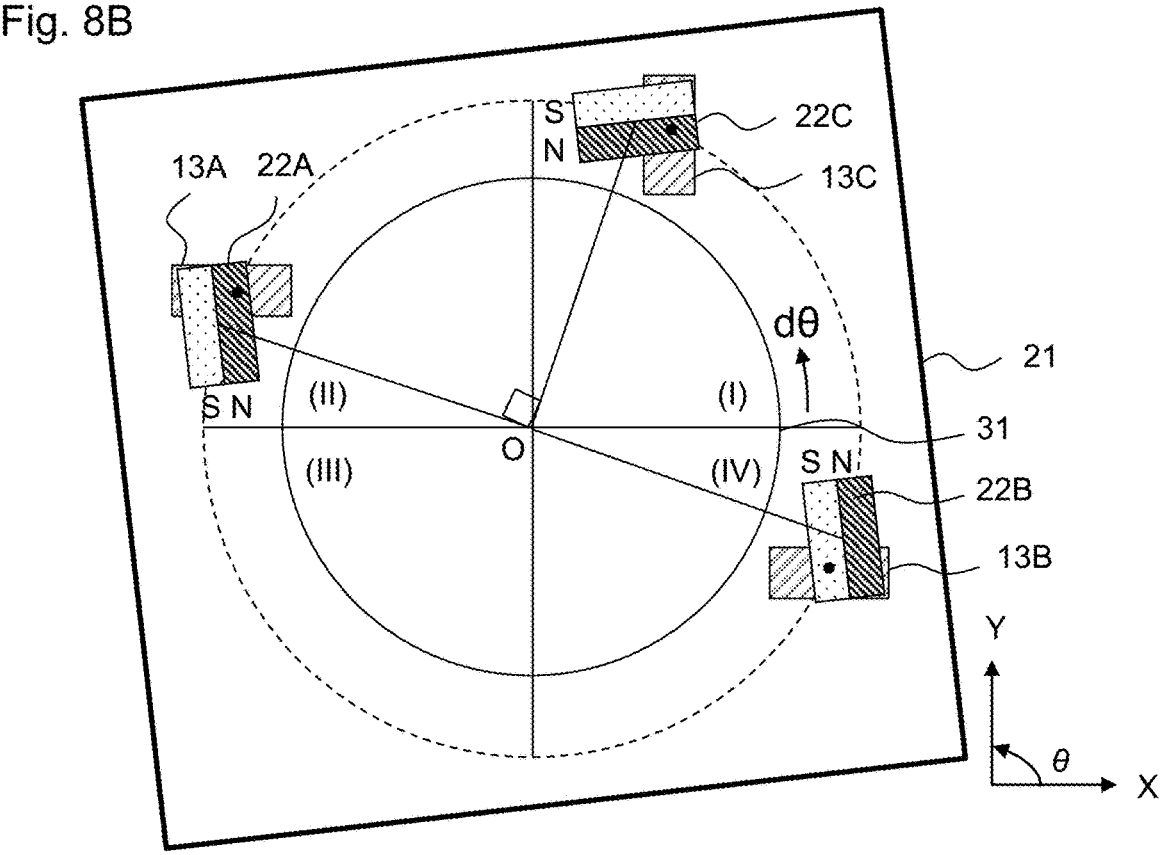

FIGS. 8A, 8B are plan views, similar to FIGS. 2A, 2B, of magnetic sensor assembly 1 according to the second embodiment, as seen in the Z direction. FIG. 8A shows first to third magnets 22A to 22C that are positioned at the reference position (the reference state), and FIG. 8B shows second member 20 that is rotated dθ in the counterclockwise direction relative to first member 10. In the present embodiment, first straight line L1 and second straight line L2 lie on a single straight line, and third straight line L3 is perpendicular both to first straight line L1 and to second straight line L2. As seen in the Z direction, the set of first magnetic sensor 13A and first magnet 22A (first position detector 2A) and the set of second magnetic sensor 13B and second magnet 22B (second position detector 2B) are positioned in different quadrants of three-dimensional Cartesian coordinate system 101 that are opposite to each other with the origin interposed therebetween. That is, first magnetic sensor 13A and first magnet 22A (first position detector 2A) are positioned in second quadrant II, and second magnetic sensor 13B and second magnet 22B (second position detector 2B) are positioned in fourth quadrant IV. Third magnetic sensor 13C and third magnet 22C (third position detector 2C) are positioned in first quadrant I. Accordingly, as compared to the first embodiment, the weight balance of second member 20 in the circumferential direction is further improved. As will be understood from FIG. 8B, the positional relationship between second magnet 22B and second magnetic sensor 13B when second member 20 is rotated dθ in the counterclockwise direction is the same as in the first embodiment (the S pole of second magnet 22B faces the center of second magnetic sensor 13B). Therefore, (formula 1) to (formula 6) are also satisfied in the present embodiment. Although not illustrated, third magnet 22C may be arranged in third quadrant III, that is, at a position that is point symmetrical to third magnet 22C in FIGS. 8A, 8B in relation to origin O.

A Modification to the Second Embodiment

Figure 9:
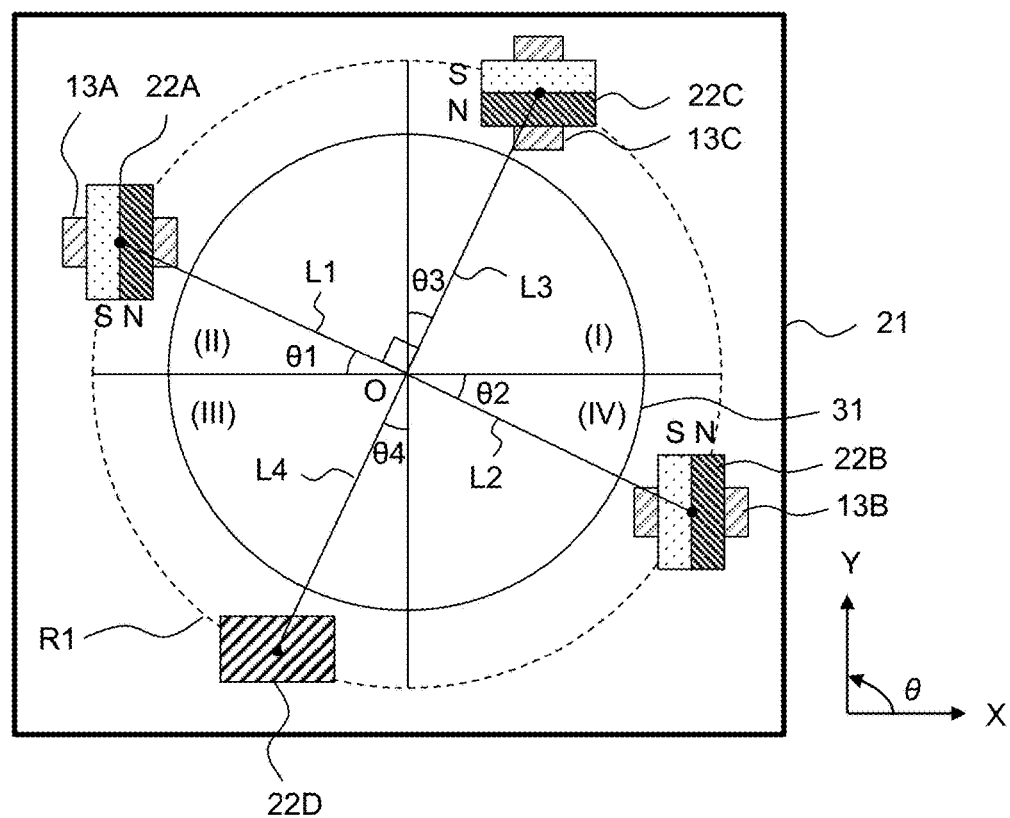
FIG. 9 is a plan view of the magnetic sensor assembly of a modification to the second embodiment.

FIG. 9 is a plan view, similar to FIG. 2A, of magnetic sensor assembly 1 of a modification to the second embodiment, as seen in the Z direction. In the present modification, balancer 22D having the same weight as first to third magnets 22A to 22C is provided opposite to magnet 22C with origin O interposed therebetween. Balancer 22D may be a magnet having the same weight as first to third magnets 22A to 22C, but any element having the same weight as first to third magnets 22A to 22C may be used. The center of balancer 22D is positioned on fourth straight line L4 that extends from origin O of first X-Y plane P1, as seen in the Z direction. Fourth straight line L4 is perpendicular both to first straight line L1 and to second straight line L2. Therefore, fourth angle θ4 that is formed between fourth straight line L4 and the Y axis is the same as first to third angles θ1 to θ3. Since first to third magnets 22A to 22C and balancer 22D are arranged at intervals of 90 degrees on a single circle, the weight balance of second member 20 in the circumferential direction is further improved, as compared to the second embodiment. Balancer 22D may be arranged in a quadrant that is different from the quadrant where first magnetic sensor 13A and first magnet 22A (first position detector 2A) are arranged, the quadrant where second magnetic sensor 13B and second magnet 22B (second position detector 2B) are arranged and the quadrant where third magnetic sensor 13C and third magnet 22C (third position detector 2C) are arranged, and it is not necessary to arrange balancer 22D in rotational symmetry with first to third magnets 22A to 22C.

Third Embodiment

Figure 10:
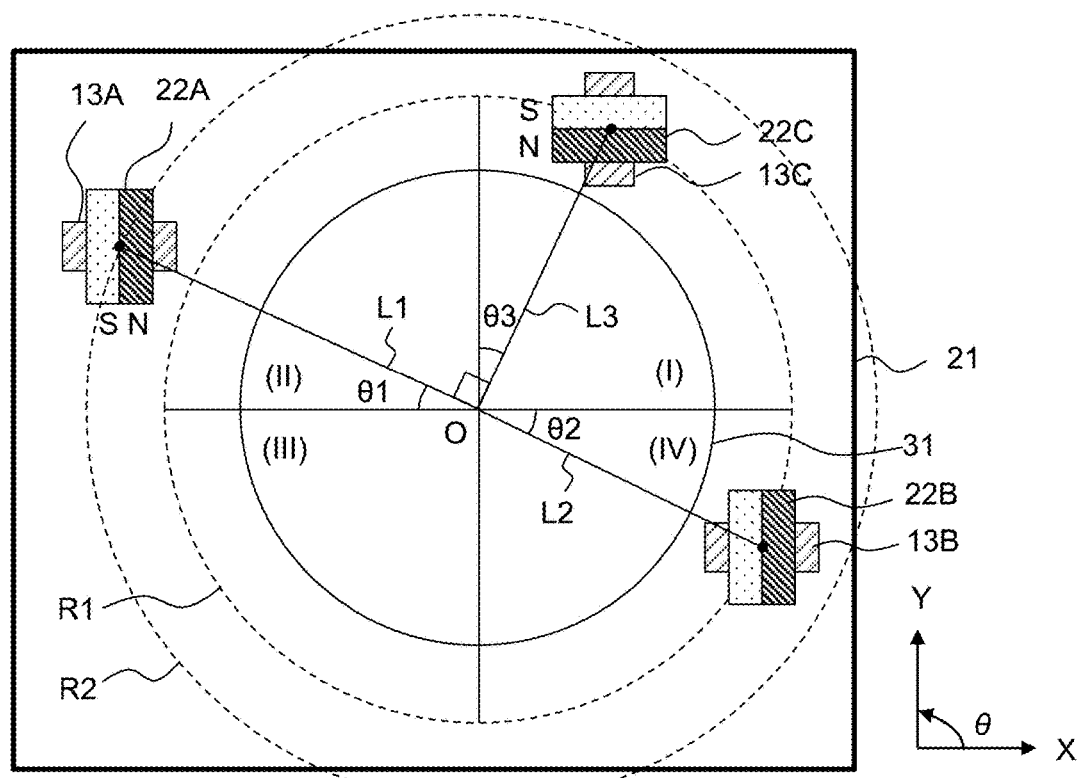
FIG. 10 is a plan view of the magnetic sensor assembly of a third embodiment.

FIG. 10 is a plan view, similar to FIG. 2A, of magnetic sensor assembly 1 according to the third embodiment, as seen in the Z direction. As seen in the Z direction, the center of any one of first to third magnets 22A to 22C and the center of another one of first to third magnets 22A to 22C are positioned on different circles R1, R2 whose centers are on the origin of three-dimensional Cartesian coordinate system 101 but whose radii are different from each other. In the present embodiment, the center of first magnet 22A is further away from origin O than the centers of second and third magnets 22B, 22C. As a result, the center of first magnetic sensor 13A is further away from origin O than the centers of second and third magnetic sensors 13B, 13C. Accordingly, when first magnetic sensor 13A is rotated dθ, the displacement of first magnetic sensor 13A in the X direction increases. In other words, the sensitivity of first magnetic sensor 13A can be enhanced. Suppose that [the distance of the center of first magnet 22A from origin O]: [the distance the centers of second and third magnets 22B, 22C from origin O]=n:1, then, (formula 1) to (formula 6) can be rewritten as follows.

$$V_{x1}=f_{(dX)}+n\times f_{(d\theta)} \quad \text{(formula 1'')}$$

$$V_{x2}=f_{(dX)}-f_{(d\theta)} \quad \text{(formula 2)}$$

$$V_{y}=f_{(dY)}+f_{(d\theta)} \quad \text{(formula 3)}$$

$$f_{(dX)}=V_{x1}-(V_{x1}-V_{x2})/(1+n) \quad \text{(formula 4'')}$$

$$f_{(dy)}=V_{y}-(V_{x1}-V_{x2})/(1+n) \quad \text{(formula 5'')}$$

$$f_{(d\theta)}=(V_{x1}-V_{x2})/(1+n) \quad \text{(formula 6'')}$$

That is, $f_{(dX)}$, $f_{(dy)}$, $f_{(d\theta)}$ can be basically calculated in the same manner as the first embodiment, with only (formula 1) and (formula 4) to (formula 6) being different. It should be noted that, in the present embodiment, intermediate planes 24 of first and second magnets 22A, 22B between the N poles and the S poles cross circle R1, as seen in the Z direction, but may be tangential to circle R1. This is because n is not equal to 1, unlike the comparative examples, and therefore $V_{x1}=V_{x2}$ is not satisfied.

Although not illustrated, third magnet 22C may be arranged in third quadrant III, that is, at a position that is point symmetrical to third magnet 22C in FIG. 10 in relation to origin O. Furthermore, second magnet 22B may be arranged in third quadrant III, that is, at the position of second magnet 22B in FIGS. 2A, 2B, and in that case, the modifications 1-1 to 1-7 shown in FIGS. 4, 5 may also be applied. Further, in the present embodiment, the position of first magnet 22A is changed from the first embodiment, but the position of second magnet 22B or third magnet 22C may be changed alternatively, and first to third magnets 22A to 22C may be arranged at positions whose distances from origin O are different from each other.

Fourth Embodiment

Figure 11:
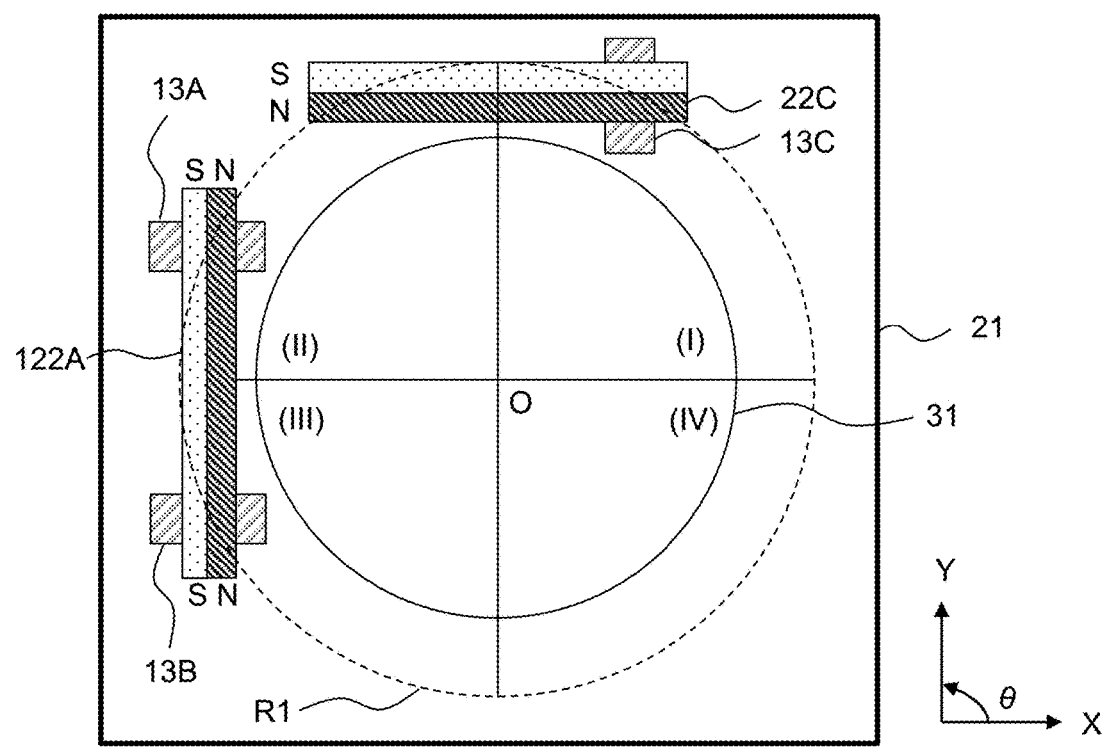
FIG. 11 is a plan view of the magnetic sensor assembly of a fourth embodiment.

FIG. 11 is a plan view, similar to FIG. 2A, of magnetic sensor assembly 1 according to the fourth embodiment, as seen in the Z direction. In the present embodiment, first magnet 22A and second magnet 22B are integrated over the X axis so as to form first magnet 122A. Third magnet 22C is extended into second quadrant II such that third magnet 22C is symmetric in relation to the Y axis. That is, third magnet 22C extends parallel to the X axis on both sides of the Y axis. As will be understood from the comparison between FIG. 2A and FIG. 2B, first magnet 22A and second magnet 22B are rotated about origin O without changing their relative positions. In other words, first magnet 22A and second magnet 22B can be moved in the same manner as in the first embodiment, even if they are bounded with each other (that is, integrated in the present embodiment). Therefore, magnetic sensor assembly 1 of the present embodiment satisfies formulas (1) to (6), and operates in the same manner as magnetic sensor assembly 1 of the first embodiment. It should be noted that when first magnet 22A or second magnet 22B is long, in order to avoid interference with lens 31, care should be taken of the position where the magnet is attached and of the manner of attaching the magnet.

The elongated magnets 122A, 22C increase the degree of freedom of the positions where first to third magnetic sensors 13A to 13C are arranged, and allow, for example, first to third angles θ1 to θ3 to be set smaller. That is, according to the present embodiment, it is possible to increase the degree of freedom of the design of magnetic sensor assembly 1. The arrangement of the magnets in the camera module is not limited to the example shown in FIG. 1, and for example, magnets for driving lens 31 and for the OIS may be arranged at the position shown in FIG. 11. In the present embodiment, such magnets may be used as first magnet 122A and third magnet 22C. It should be noted that it is not necessary to elongate third magnet 22C and which may have the same shape as in the first to third embodiments.

The aforementioned embodiments are further generalized as follows. When second member 20 is moved dX (translation) in the X direction and dY in the Y direction (translation) and is rotated dθ about the Z axis relative to first member 10, the change of the output $V_{x1}$ of first magnetic sensor 13A, the change of the output $V_{x2}$ of second magnetic sensor 13B and the change of the output $V_y$ of third magnetic sensor 13C are calculated as follows.

$$V_{x1} = f_{(dX)} + a \times f_{(d\theta)} \quad \text{(formula 7)}$$

$$V_{x2} = f_{(dX)} + b \times f_{(d\theta)} \quad \text{(formula 8)}$$

$$V_y = f_{(dY)} + c \times f_{(d\theta)} \quad \text{(formula 9)}$$

Here, $f_{(dX)}$, $f_{(dY)}$, $f_{(d\theta)}$ are the change of the output of each magnetic sensor caused by dX, dY and dθ, respectively, and a, b, c are constants. (formula 7) to (formula 9) are transformed as follow.

$$f_{(dX)} = V_{x1} - a \times (V_{x1} - V_{x2})/(a-b) \quad \text{(formula 10)}$$

$$f_{(dy)} = V_y - c \times (V_{x1} - V_{x2})/(a-b) \quad \text{(formula 11)}$$

$$f_{(d\theta)} = (V_{x1} - V_{x2})/(a-b) \quad \text{(formula 12)}$$

The constants a, b, c are determined, for example, by the positions where first to third magnets 22A to 22C are arranged. Specifically, a=1, b=−r2/r1, c=r3/r1 (here, r1, r2, r3 are distances of the centers of first to third magnets 22A to 22C from the origin of three-dimensional Cartesian coordinate system 101, respectively, as seen in the Z direction). As will be understood from (formula 7) to (formula 9), since the constants a, b, c are coefficients that are multiplied by $f_{(d\theta)}$, the constants a, b, c may be, for example, proportional to the sensitivity of third magnetic sensor 13C. As will be understood from (formula 10) to (formula 12), if $V_{x1}=V_{x2}$, then $f_{(dx)}=V_{x1}$, $f_{(dy)}=V_y$, $f_{(d\theta)}=0$, and the rotational angle cannot be calculated. Therefore, $V_{x1} \neq V_{x2}$ is an essential condition. It should be noted that a≠b must be satisfied, as will be understood from (formula 10) to (formula 12), but if $V_{x1} \neq V_{x2}$, then this condition is automatically satisfied from the comparison between (formula 7) and (formula 8).

The present invention has been described using some embodiments, but the present invention is not limited to these embodiments. For example, in the present embodiment, first member 10 is a fixed part, and second member 20 is a movable part, but first member 10 may be a movable part, and second member 20 may be a fixed part. Furthermore, first magnet 22A and second magnet 22B are each provided in one quadrant, but may be provided on the X axis or the Y axis (for example, the position shown by the broken line in FIG. 2A), that is, over two quadrants. Also in this case, as long as intermediate planes 24 of first and second magnets 22A, 22B between the N poles and the S poles cross circle R1 and $V_{x1} \neq V_{x2}$ is satisfied, the displacement of second member 20 may be calculated using (formula 1) to (formula 6). Furthermore, the present invention has been described as magnetic sensor assembly 1 that is applied to camera module 100, but of course, magnetic sensor assembly 1 may be applied to any use other than camera module 100.

Figure 12:
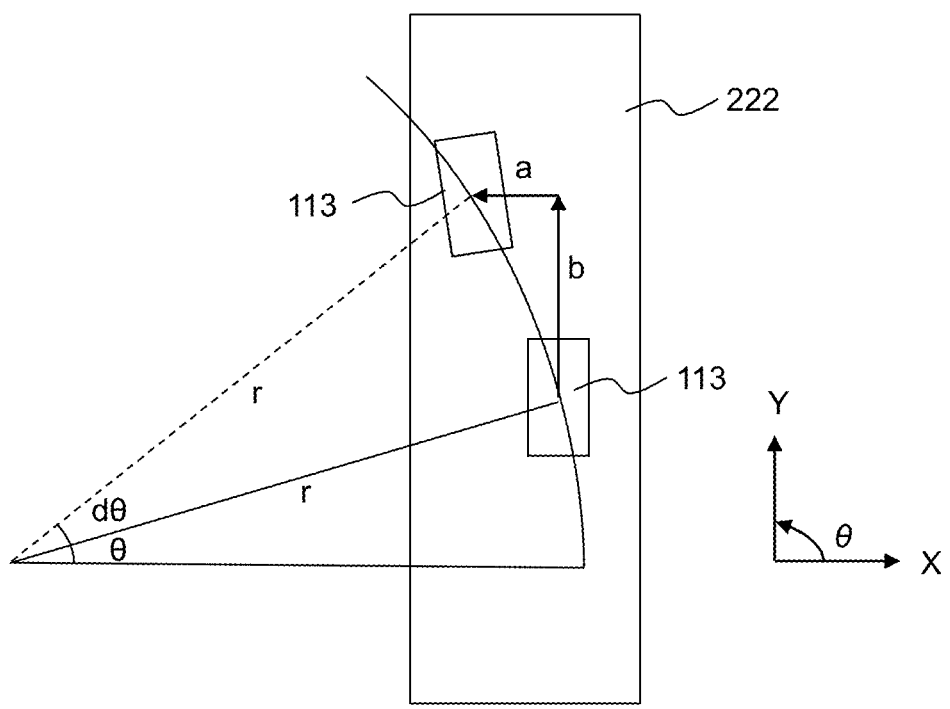
FIG. 12 is a view illustrating another modification.

Furthermore, as described in the first embodiment, an increase of the size of casing 21 can be prevented by setting first angle θ1 and second angle θ2 between 20 and 70 degrees. However, an increase of the size of casing 21 can also be prevented by setting first angle θ1 and second angle θ2 between 0 and 20°. In the following description, the magnetic sensor is rotated for convenience, but magnet may be rotated alternatively. In FIG. 12, magnetic sensor 113 faces magnet 222 and is arranged at the initial position of angle θ. FIG. 12 also shows magnetic sensor 113 that is rotated dθ in the counterclockwise direction from the initial position. Suppose that 'a' and 'b' are displacements of magnetic sensor 113 in the X direction and in the Y direction, respectively, after the rotation of dθ, and 'r' is the distance of the magnetically sensing part of magnetic sensor 113 from the origin. Then, the following formulas are satisfied.

$$a = 2 \times r \times \sin(d\theta/2) \times \sin(d\theta/2 + \theta) = C \times \sin(\theta)$$

$$b = 2 \times r \times \sin(d\theta/2) \times \cos(d\theta/2 + \theta) = C' \times \cos(\theta)$$

Here, C and C' are constants. The angle dθ is obtained, for example, by the OIS function.

When the magnetically sensing part of magnetic sensor 113 is within magnet 222, as seen in the Z direction, magnetic sensor 113 can operate, but when the magnetically sensing part is outside of magnet 222, it is difficult for magnetic sensor 113 to operate. As will be understood from the above formulas, 'a' is small for small angle θ. Therefore, an increase of the size of casing 21 can be prevented by limiting the dimension of magnet 222 in the X direction. Angle θ is preferably in the range of 0<θ≤20° and, for example, θ=8°.

Figure 13A:
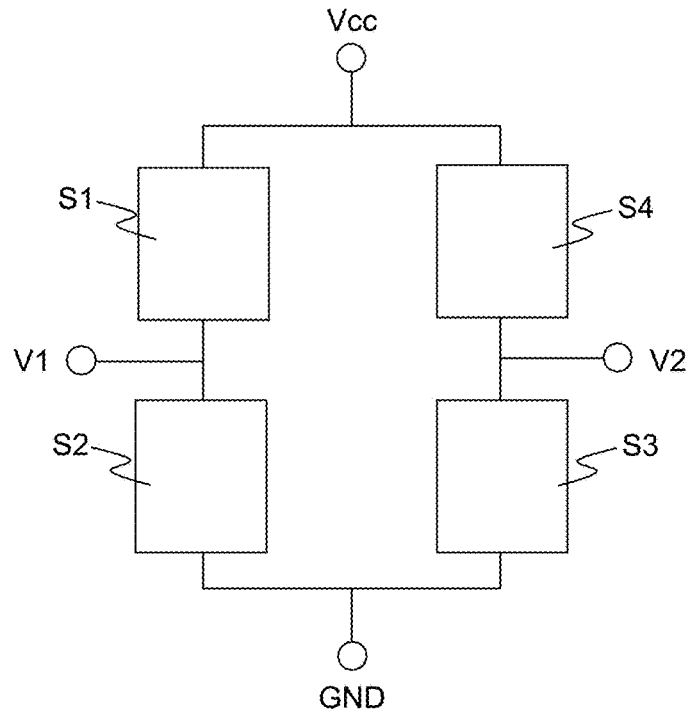
FIGS. 13A, 13B are views illustrating another modification.

Furthermore, as described above with reference to FIG. 7, $f_{(dX)}$, $f_{(dy)}$, $f_{(d\theta)}$ cannot be calculated in comparative examples 1-1 to 1-4. However, in those cases, $f_{(dX)}$, $f_{(dy)}$, $f_{(d\theta)}$ can be calculated by modifying the method of processing signals. FIG. 13A shows a magnetic sensor in which first to fourth magnetic field detecting elements S1 to S4, such as a Hall element and a MR element, are interconnected by a bridge circuit (Wheatstone bridge). Four magnetic field detecting elements S1 to S4 are divided into two sets (one set S1, S2 and another set S3, S4) and magnetic field detecting element S1, S2 and magnetic field detecting element S3, S4 in each set are connected in series. One end of magnetic field detecting elements set S1, S2 and one end of magnetic field detecting elements set S3, S4 are connected to supply voltage Vcc, and the other ends are grounded (GND). Furthermore, intermediate voltage V1 between magnetic field detecting element S1 and magnetic field detecting element S2, and intermediate voltage V2 between magnetic field detecting element S3 and magnetic field detecting element S4 are outputted. The voltage drops of magnetic field detecting elements S1 to S4 are substantially proportional to the electric resistances of magnetic field detecting elements S1 to S4, respectively. Therefore, intermediate voltages V1, V2 are calculated by the formulas below, where R1 to R4 are the electric resistances of magnetic field detecting elements S1 to S4, respectively, and differential V1-V2 of intermediate voltages V1, V2 is typically outputted as the output of the magnetic sensor.

$$V_1 = \frac{R_2}{R_1 + R_2} V_{cc}$$

$$V_2 = \frac{R_3}{R_3 + R_4} V_{cc}$$

Figure 13B:
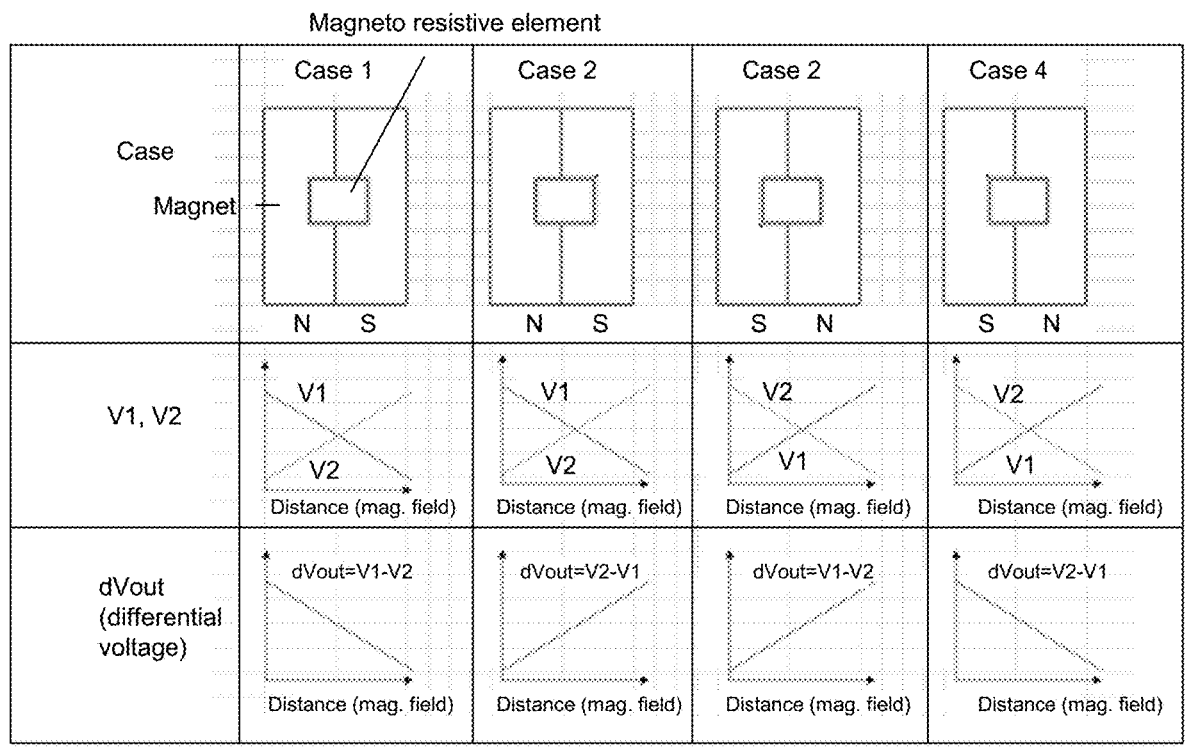
Figure 14A:
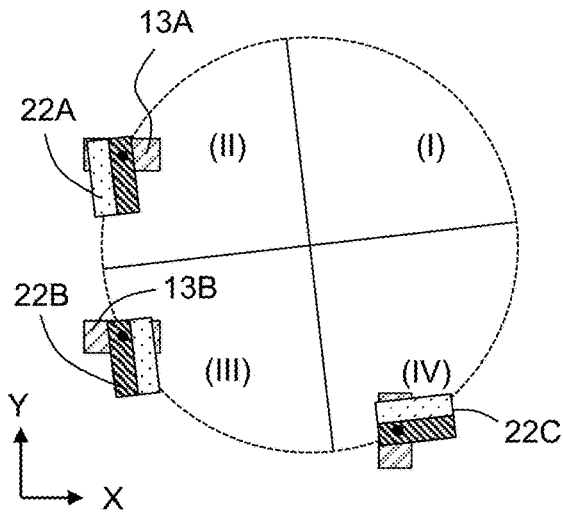
FIGS. 14A to 14C are views illustrating another modification.
Figure 14B:
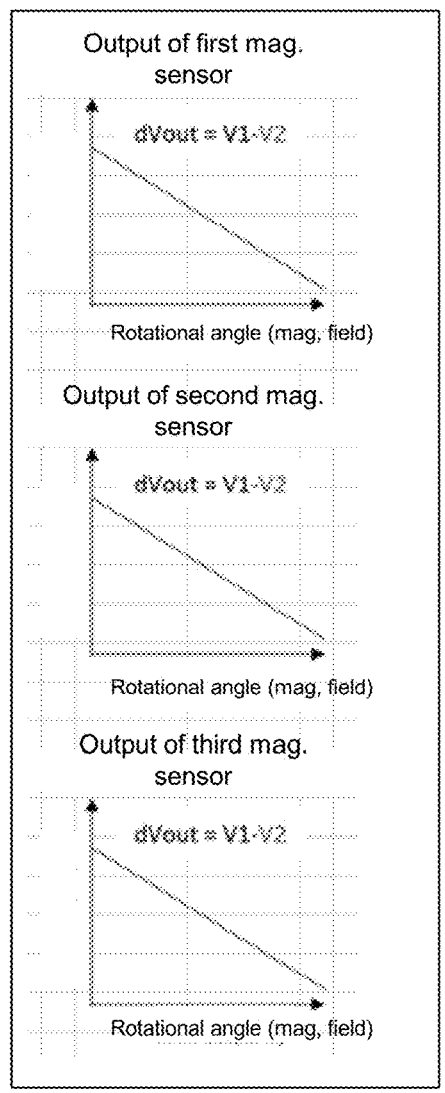
Figure 14C:
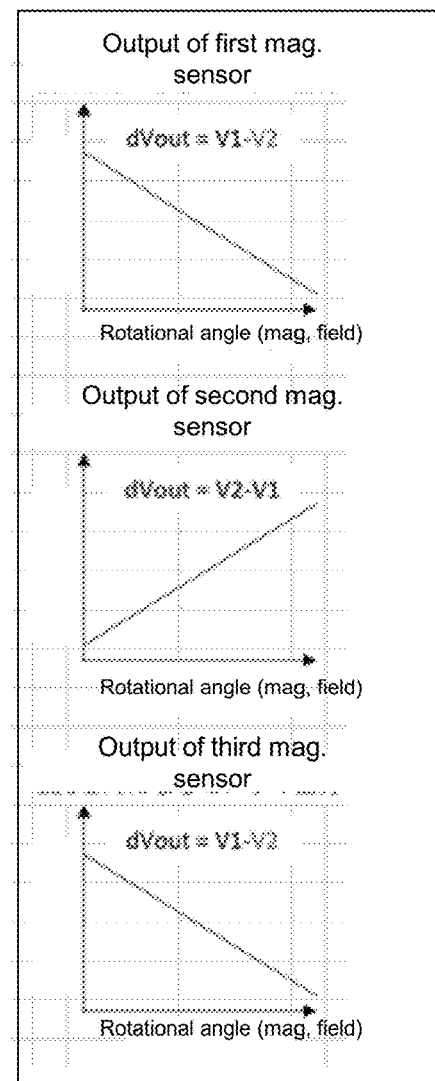

FIG. 13B shows a typical arrangement of the magnet and the magnetic field detecting element, as well as a method of processing the output. Case 1 and case 3 show a typical method of outputting the differential output. However, as will be understood from the comparison between case 1 and case 2 (or the comparison between case 3 and case 4), even if the magnet is magnetized in the same direction, the polarity of the output changes depending on which out of V1-V2 and V2-V1 is used as differential output dV. FIG. 14A shows a conceptual arrangement of a magnetic sensor similar to comparative example 1-3 shown in FIG. 7. FIG. 14B conceptually shows the output of each magnetic sensor when V1-V2 is used as differential output dV for all of the magnetic sensors. In this case, since the outputs of first and second magnetic sensors 13A, 13B are the same, $f_{(dX)}$, $f_{(dy)}$, $f_{(d\theta)}$ cannot be calculated. On the other hand, in FIG. 14C, V2-V1 is used as differential output dV of second magnetic sensor 13B. Thus, the output of magnetic sensor 13A and the output of magnetic sensor 13B are different from each other, and $f_{(dX)}$, $f_{(dy)}$, $f_{(d\theta)}$ can be calculated. In this manner, $f_{(dX)}$, $f_{(dy)}$, $f_{(d\theta)}$ can also be calculated by first and second magnetic sensors 13A, 13B having inverse polarities of the differential output.

Although certain preferred embodiments of the present invention have been shown and described in detail, it should be understood that various changes and modifications may be made without departing from the spirit or scope of the appended claims.

What is claimed is:

1. A magnetic sensor assembly comprising: a first member having first to third magnetic sensors; and a second member having first to third magnets,
wherein the second member can be moved in X and Y directions and can be rotated about a Z axis relative to the first member in a three-dimensional Cartesian coordinate system, and the first to third magnetic sensors face the first to third magnets in a Z direction, respectively,
wherein output of the first magnetic sensor monotonously changes depending on a relative displacement between the first magnetic sensor and the first magnet in the X direction, output of the second magnetic sensor monotonously changes depending on a relative displacement between the second magnetic sensor and the second magnet in the X direction, and output of the third magnetic sensor monotonously changes depending on a relative displacement between the third magnetic sensor and the third magnet in the Y direction, and
when the second member is moved in the X and Y directions and is rotated about the Z axis relative to the first member, a change of the output of the first magnetic sensor and a change of the output of the second magnetic sensor are different from each other, and
the first to third magnets are positioned on first to third straight lines that extend from an origin of a predetermined X-Y plane, respectively, and a first angle that is formed between the first straight line and an X axis, a second angle that is formed between the second straight line and the X axis, and a third angle that is formed between the third straight line and a Y axis are same.

2. The magnetic sensor assembly according to claim 1, wherein the first angle, the second angle and the third angle are larger than 0 degree and less than or equal to 90 degrees.

3. The magnetic sensor assembly according to claim 1, wherein the first angle, the second angle and the third angle are between 20 and 70 degrees.

4. The magnetic sensor assembly according to claim 2, wherein the first angle, the second angle and the third angle are 90 degrees.

5. A magnetic sensor assembly comprising: a first member having first to third magnetic sensors; and a second member having first to third magnets,
wherein the second member can be moved in X and Y directions and can be rotated about a Z axis relative to the first member in three-dimensional Cartesian coordinate system, and the first to third magnetic sensors face the first to third magnets in a Z direction, respectively,
wherein output of the first magnetic sensor monotonously changes depending on a relative displacement between the first magnetic sensor and the first magnet in the X direction, output of the second magnetic sensor monotonously changes depending on a relative displacement between the second magnetic sensor and the second magnet in the X direction, and output of the third magnetic sensor monotonously changes depending on a relative displacement between the third magnetic sensor and the third magnet in the Y direction, and
when the second member is moved dX in the X direction and dY in the Y direction and is rotated dθ about the Z axis relative to the first member, following formulas are satisfied:

$$f_{(dx)} = V_{x1} - a \times (V_{x1} - V_{x2})/(a-b)$$

$$f_{(dy)} = V_y - c \times (V_{x1} - V_{x2})/(a-b)$$

$$f_{(d\theta)} = (V_{x1} - V_{x2})/(a-b)$$

where
$V_{x1}$ is a change of the output of the first magnetic sensor,
$V_{x2}$ is a change of the output of the second magnetic sensor,
Vy is a change of the output of the third magnetic sensor,
$f_{(dx)}$, $f_{(dy)}$, $f_{(d\theta)}$ are change of the outputs of the first to third magnetic sensor, which are caused by dX, dY, dθ, respectively, a, b, c are constants, and
$V_{x1} \neq V_{x2}$.

6. The magnetic sensor assembly according to claim 5, wherein, as seen in the Z direction, a=1, b=−r2/r1, c=r3/r1, wherein r1, r2, r3 are distances of centers of the first to third magnets from an origin of the three-dimensional Cartesian coordinate system, respectively.

7. The magnetic sensor assembly according to claim 1, wherein, as seen in the Z direction, a set of the first magnetic sensor and the first magnet and a set of the second magnetic sensor and the second magnet are positioned in different quadrants that are opposite to each other, with an origin of the three-dimensional Cartesian coordinate system interposed therebetween.

8. The magnetic sensor assembly according to claim 1, wherein, as seen in the Z direction, a set of the first magnetic sensor and the first magnet and a set of the second magnetic sensor and the second magnet are positioned in different quadrants that are opposite to each other, with the X axis of the three dimensional Cartesian coordinate system interposed therebetween.

9. The magnetic sensor assembly according to claim 7, wherein, as seen in the Z direction, the third magnetic sensor and the third magnet are positioned in a quadrant that is different both from the quadrant where the first magnetic sensor and the first magnet are positioned and from the quadrant where the second magnetic sensor and the second magnet are positioned.

10. The magnetic sensor assembly according to claim 9, wherein the second member is movable relative to the three-dimensional Cartesian coordinate system, and the first to third magnets have a same weight,
the second member is provided with a balancer having a same weight as first to third magnets, and wherein the balancer is positioned in a quadrant that is different from the quadrant where the first magnet is positioned, the quadrant where the second magnet is positioned and the quadrant where the third magnet is positioned.

11. The magnetic sensor assembly according to claim 1, wherein, as seen in the Z direction, centers of the first to third magnets are positioned on a single circle whose center is at an origin of a predetermined X-Y plane of the three-dimensional Cartesian coordinate system.

12. The magnetic sensor assembly according to claim 11, wherein, as seen in the Z direction, intermediate planes of the first and second magnets between N poles and S poles cross the circle.

13. The magnetic sensor assembly according to claim 1, wherein, as seen in the Z direction, one of centers of the first to third magnets and another one of the centers are positioned on concentric circles having different radii whose centers are at an origin of a predetermined X-Y plane of the three-dimensional Cartesian coordinate system.

14. The magnetic sensor assembly according to claim 1, wherein the first magnet and the second magnet are magnetized in a same direction, and the third magnet is magnetized in a direction perpendicular to magnetization directions of the first and second magnets.

15. The magnetic sensor assembly according to claim 1, further comprising a third member that is arranged inside of the second member, wherein the third member is driven by the first to third magnets such that the third member is movable relative to the second member.

16. The magnetic sensor assembly according to claim 15, wherein the second member has a rectangular casing that surrounds the third member, the third member is circular, as seen in the Z direction, and the first to third magnets are provided in corner portions of the casing.

17. The magnetic sensor assembly according to claim 8, wherein the first magnet and the second magnet are integrated over the X axis.

18. The magnetic sensor assembly according to claim 17, wherein the third magnet extends parallel to the X axis on both sides of the Y axis.

19. A camera module comprising the magnetic sensor assembly according to claim 1.

* * * * *